No. 689,264. Patented Dec. 17, 1901.
A. E. WHITEHOUSE.
DEVICE FOR FASTENING COLLARS, PULLEYS, OR THE LIKE ON SHAFTS OR MANDRELS.
(Application filed Mar. 1, 1901.)
(No Model.)
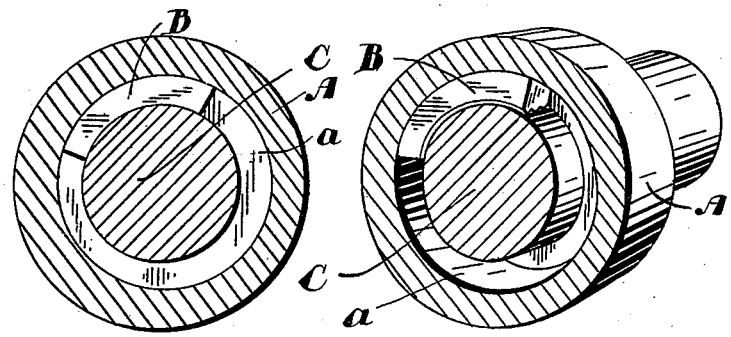
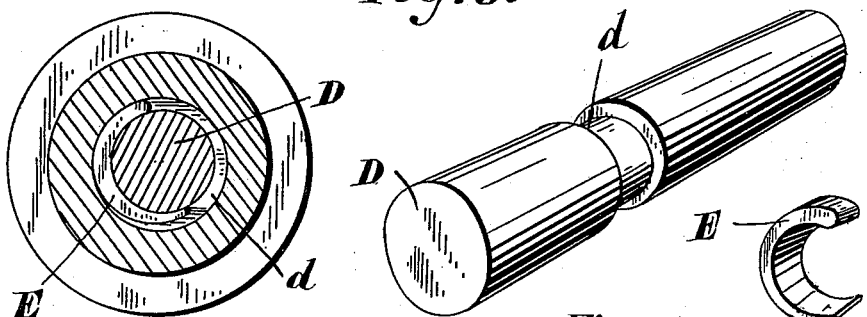
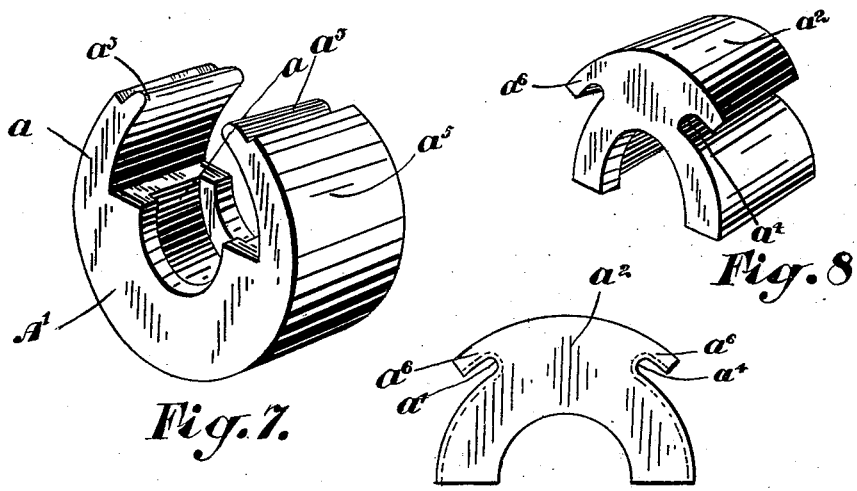
Witnesses.
F. C. Hall.
Z. Blackmore
Inventor:
A. E. Whitehouse
by Fetherstonhaugh & Co.
Att'ys

UNITED STATES PATENT OFFICE.

ARTHUR EDWARD WHITEHOUSE, OF MONTREAL, CANADA.

DEVICE FOR FASTENING COLLARS, PULLEYS, OR THE LIKE ON SHAFTS OR MANDRELS.

SPECIFICATION forming part of Letters Patent No. 689,264, dated December 17, 1901.

Application filed March 1, 1901. Serial No. 49,500. (No model.)

*To all whom it may concern:*

Be it known that I, ARTHUR EDWARD WHITEHOUSE, a subject of the King of Great Britain, and a resident of the city and district of Montreal, Province of Quebec, Canada, have invented certain new and useful Improvements in Devices for Fastening Collars, Pulleys, or the Like on Shafts or Mandrels, of which the following is a specification.

My invention relates to a device for fastening collars, pulleys, and the like on shafts or mandrels; and the object of the invention is to provide a fastening which shall overcome the necessity of any circumferential obstruction on the outer periphery of the revolving body and allow the latter to be removed readily from the shaft or mandrel; and it consists, essentially, of a suitable wedge fitted in an eccentric groove either made in the inner circumference of the collar or on the shaft or mandrel itself. Where a collar is to be removed from a fixed shaft, a tapered section is provided with the channel or groove in its inside circumference, the cut-out or tapered portion being so shaped as to have a concentric bearing from its circumferential outside surface, the various parts being constructed in detail as hereinafter more particularly described.

Figure 1 is a sectional plan view showing eccentric nature of groove in collar and wedge. Fig. 2 is a sectional perspective view of the same. Fig. 3 is a detail of a wedge. Fig. 4 is a sectional plan view showing eccentric nature of groove on shaft or mandrel. Fig. 5 is a detail of mandrel. Fig. 6 is a detail of a wedge. Fig. 7 is a detail of split collar with section removed. Fig. 8 is a detail of section of split collar. Fig. 9 is a plan view of tapered section.

Like letters of reference indicate corresponding parts in each figure.

A is the collar, which has a groove $a$ in its inner circle deeper at one portion and growing gradually shallower as it completes the circle of the inner surface of the bearing.

B is an arc-shaped wedge, preferably corrugated on its inner surface and designed to slide easily in the groove $a$. The collar A when placed on the shaft C will slip around with ease as long as the wedge remains in the deeper portion of the eccentric groove $a$, but the wedge B, gripping the shaft C, will not allow the collar to move either way to any extent without binding and fastening very firmly, for the shallow portion of the groove $a$ moves over the wedge B.

D is a mandrel, showing an alternative manner of using my device—that is, the wedge E is made so as to form about two-thirds of a complete circle and is designed to snap into a corresponding groove $d$, encircling the mandrel or shaft D. The groove $d$ is eccentric to the mandrel D, or, in other words, it is deeper in one portion than it is in the other, and the wedge E is also thicker at one portion than the other. The pulley, collar, or other device, being on the mandrel or shaft D and over the wedge E, will on the slightest turn tighten and bind similarly to the collar A with the eccentric groove $a$ in its inner circle.

In Figs. 7, 8, and 9 I show views of a split collar A', also with an internal groove, necessary where the collar cannot be placed on the shaft from the end. The grooves $a^4$ are formed by the overlapping portions $a^6$ of the outer periphery. The lugs $a^5$ have reduced extremities $a^3$, which extremities are so shaped as to correspond to the grooves $a^4$ and fit snugly therein. It will be thus seen that the overlapping portions $a^6$ have a concentric bearing on the extremities $a^3$, counteracting any tendency of the lugs $a^5$ to spread or break from the outward strain. The shape of the section $a^2$ and its corresponding recess in the main portion A' is most essential to the strength of the collar, as usually in split collars the parts loosen and frequently break from the outward strain incidental to any revolving body not having a concentric bearing from all portions of its circumferential surface. The application of my wedge to this particular form of split collar does not in any way affect the workability of the device.

In order to put my device to practical use, I place the collar on a shaft either in the whole form A or in the split form A', taking care to see that the wedge B is in place in the groove $a$, which will be, of course, in the deeper portion of the groove, so that it may readily slip onto the shaft. The collar is then tightened on the shaft by being turned in the opposite direction to the motion of the latter. This makes it preferable to have the wedge B tapered toward each end from the middle, so that sufficient bearing-surface of the wedge may be used, no matter which way the latter may be tightened. In the drawings I show the wedge as tapered toward one end, which would necessarily make it advisable to always tighten it up toward the smaller end, so as to give more bearing-surface. However, this is a minor point and one in which the users will be entirely guided by circumstances.

The alternative form of the invention shown, in which the eccentric groove is cut into the shaft or mandrel, is more applicable, particularly to lathe-work, it being a most convenient form of tightening any work, such as pulley-wheels, being turned. In this, as in the collar, the tightening should be done in the opposite direction to the motion of the shaft. This makes it absolutely imperative for the pulley-wheel or other work being done on the lathe to tighten ever more firmly as the work progresses.

The great features, of course, in this invention are the perfect periphery of the collar when used for that purpose and the ease with which a collar, pulley, or coupling is tightened onto the shaft or mandrel, insuring perfect security in the position of the collar.

Without departing from the spirit of my invention I may substitute for the arc-shaped wedge described a roller, which wedges the collar in substantially the same manner, though as a rule the arc-shaped wedge will be found preferable.

What I claim as my invention is—

1. The combination with the shaft, of a split collar comprising the major portion formed with curved projections protruding into the minor portion, and having a tapered internal longitudinal recess and the minor portion or section tapered and provided with suitable grooves to receive the said projections of the major portion, said minor portion having flanges extending down over and embracing the outer sides of the projecting portions or arms of the major portion whereby the said arms are prevented from spreading, as and for the purpose specified.

2. The combination with a pulley and a mandrel having an external circumferential cut tapering circularly, of an arc-shaped wedge extending around the major portion of the circle, and designed to snap into the aforesaid groove, as and for the purpose specified.

3. The combination with a shaft and a collar provided with an internal channel circularly tapered, having sides forming a bearing on the shaft, of a wedge tapering from one end, and adapted to fit in said internal channel with its inner surface bearing on the shaft from end to end, and the outer and convex surface designed to bear on the bed of the channel substantially to the full extent of the length of the wedge, as and for the purpose specified.

4. The combination with a shaft, of a split collar having its major portion provided with circumferentially-projecting parts, of which the top ends are reduced from the outer edge face, and the minor portion with overhangs designed to slide over the reduced top ends aforesaid and form a concentric bearing through the minor and major portions, an internal channel with walls forming a bearing on the shaft in the major portion, the said channel when the parts are joined being circularly tapered, a wedge arc-shaped and tapering from a thick end with full-length bearing-surfaces on the face and back, as and for the purpose specified.

Signed at Montreal this 27th day of February, 1901.

ARTHUR EDWARD WHITEHOUSE.

Witnesses:
FRANK C. HALL,
L. BLACKMORE.